(12) United States Patent
Moriarty et al.

(10) Patent No.: US 8,691,005 B2
(45) Date of Patent: Apr. 8, 2014

(54) BINDER COMPOSITION FOR USE IN CELLULOSIC COMPOSITES AND METHODS RELATED THERETO

(75) Inventors: Christopher J. Moriarty, The Woodlands, TX (US); Sachchida N. Singh, Moorestown, NJ (US); Gordon D. Oppenheimer, The Woodlands, TX (US)

(73) Assignee: Huntsman International LLC, The Woodlands, TX (US)

( * ) Notice: Subject to any disclaimer, the term of this patent is extended or adjusted under 35 U.S.C. 154(b) by 204 days.

(21) Appl. No.: 13/187,286

(22) Filed: Jul. 20, 2011

(65) Prior Publication Data
US 2013/0019778 A1    Jan. 24, 2013

(51) Int. Cl.
*C08L 97/02* (2006.01)
*D04H 1/64* (2012.01)

(52) U.S. Cl.
USPC ....................................... 106/164.3; 264/128

(58) Field of Classification Search
None
See application file for complete search history.

(56) References Cited

U.S. PATENT DOCUMENTS

| 4,176,217 A | 11/1979 | Golser et al. |
| 5,587,414 A | 12/1996 | Leenslag et al. |
| 5,770,672 A | 6/1998 | Gitlitz et al. |
| 6,288,200 B1 | 9/2001 | Jung et al. |
| 6,288,255 B1 | 9/2001 | Skinner |
| 6,750,310 B1 | 6/2004 | Skinner |
| 6,762,314 B2 | 7/2004 | Partridge et al. |
| 6,908,875 B2 * | 6/2005 | Skinner et al. ............... 502/102 |
| 2006/0094794 A1 * | 5/2006 | Shidaker et al. ............... 521/53 |
| 2010/0168287 A1 | 7/2010 | Moriarty et al. |

FOREIGN PATENT DOCUMENTS

| JP | 88014021 | 3/1988 |
| WO | WO 2010/049516 | 5/2010 |
| WO | WO 2010/049518 | 5/2010 |

* cited by examiner

*Primary Examiner* — Melvin C Mayes
*Assistant Examiner* — Stefanie Cohen
(74) *Attorney, Agent, or Firm* — Robert A. Diaz

(57) ABSTRACT

A blended material comprising (i) a binder composition comprising an isocyanate compound, a metallic catalyst, and an acid compound wherein the acid compound is present in the binder composition at an amount such that the acidity of the isocyanate compound ranges from 800 ppm to 10000 ppm, calculated as HCl; and (ii) a lignocellulosic material is disclosed. A lignocellulosic composite and a method of making such are also disclosed.

20 Claims, No Drawings

BINDER COMPOSITION FOR USE IN CELLULOSIC COMPOSITES AND METHODS RELATED THERETO

BACKGROUND OF THE INVENTION

1. Field of the Invention

The present invention relates generally to binder compositions.

2. Background Information

Polyphenylene polymethylene polyisocyanate (PMDI) has been extensively used as a binder in the commercial production of cellulosic based wood composites such as lignocellulosic composite panels. One of the advantages of using PMDI in the production of such composites is that the binder imparts various physical and mechanical properties to the product in addition to enhancing the processability (e.g., production times) of such composites. For example, improved processability includes process efficiencies such as shorter pressing cycle times which results in increased production of the end product.

In some embodiments, lignocellulosic composite panels are manufactured by introducing a binder, such as pMDI, into a rotary blender that contains lignocellulosic particles. After the binder and the particles have been mixed, the mixture can be introduced into a mold or a press where it is subjected to heat and pressure (e.g., pressing process) thereby forming the composite panel. One drawback with the pressing process, however, is that long pressing times are typically required to cure the binder. While the composite panel manufacturer can increase the cure rate of the binder by using urethane catalysts known in the art, one drawback with the use of such catalysts is that additional binder must be used to compensate for the binder that is inactivated, which is due to pre-cure of the binder, prior to subjecting the mixture of binder and particles to a pressing process. In these instances, the manufacture typically suffers additional costs associated with using more binder than what was anticipated.

Pre-cure of the binder is also a concern in cases where a mixture of lignocellulosic particles and binder are not subjected to a pressing process in a timely manner. Typically, the cause of such delays is due to mechanical problems in the processing equipment. Therefore, there is a need to have a binder system that can offer an induction period in which binder pre-cure is minimal prior to application of heat and pressure (i.e., latency or latent cure) while also exhibiting the ability to undergo rapid cure after the application of heat and pressure (i.e., fast cure or rapid cure) thereby allowing for the efficient production of a composite product.

SUMMARY OF THE INVENTION

The present invention is directed to a blended material comprising (i) a binder composition comprising an isocyanate compound, a metallic catalyst, and an acid compound wherein the acid compound is present in the binder composition at an amount such that the acidity of the isocyanate compound ranges from 800 ppm to 10000 ppm, calculated as HCl; and (ii) a lignocellulosic material.

The present invention is also directed to a lignocellulosic composite comprising: (a) a binder composition comprising an isocyanate compound, a metallic catalyst, and an acid compound wherein the acid compound is present in the binder composition at an amount such that the acidity of the isocyanate compound ranges from 800 ppm to 10000 ppm, calculated as HCl; and (b) a lignocellulosic material.

The present invention is also directed to a method for producing a lignocellulosic composite comprising forming a blended mixture by applying to at least one of a plurality of lignocellulosic materials a binder composition comprising an isocyanate compound, a metallic catalyst, and an acid compound wherein the acid compound is present in the composition at an amount such that the acidity of the isocyanate compound ranges from 800 ppm to 10000 ppm, calculated as HCl; and subjecting the blended mixture to heat and pressure sufficient to form the lignocellulosic composite.

DETAILED DESCRIPTION OF THE INVENTION

As used herein, unless otherwise expressly specified, all numbers such as those expressing values, ranges, amounts or percentages may be read as if prefaced by the word "about", even if the term does not expressly appear. Plural encompasses singular and vice versa. For example, although reference is made herein to "an" isocyanate compound, "a" metallic catalyst, and "an" acid compound, a combination (a plurality) of these components can be used in the present invention.

As used herein, "plurality" means two or more.

As used herein, "includes" and like terms means "including without limitation."

When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Binder Composition

As stated above, the various embodiments of the present invention comprise a binder composition. It has been surprisingly discovered that the binder composition described herein exhibits both latent and rapid cure properties which can be useful in the manufacture of various lignocellulosic materials, such as composites. "Latent", as used in the previous sentence, means the ability of the binder composition to remain uncured until it is subjected to heat and pressure such as during a pressing process or pressing stage. In general, the binder composition can be described as comprising (i) an isocyanate compound, (ii) a metallic catalyst, and (iii) an acid compound.

Various isocyanate compounds may be used as component (i) in the binder composition of the present invention. For example, in certain embodiments, an isocyanate compound such as methylene diphenyl diisocyanate ("MDI") can be used as component (i) in the binder composition. Suitable examples of MDI include those available under the RUBINATE series of MDI products (available from Huntsman International LLC). It is well known in the art that many isocyanates of such MDI series can comprise polymeric MDI. Polymeric MDI is a liquid mixture of several diphenylmethane diisocyanate isomers and higher functionality polymethylene polyphenyl isocyanates of functionality greater than 2. These isocyanate mixtures usually contain about half, by weight, of the higher functionality species. The remaining diisocyanate species present in polymeric MDI are typically dominated by the 4,4'-MDI isomer, with lesser amounts of the 2,4' isomer and traces of the 2,2' isomer. Polymeric MDI is the phosgenation product of a complex mixture of aniline-formaldehyde condensates. It typically contains between 30 and 34% by weight of isocyanate (—NCO) groups and has a number averaged isocyanate group functionality of from 2.6 to 3.0.

In addition to the aforementioned isocyanate compounds, other suitable isocyanate compounds that can be used in the present invention include, without limitation, one or more members comprising aliphatic, aryl-aliphatic, araliphatic, aromatic, and heterocyclic polyisocyanates having number averaged isocyanate (—NCO) group functionalities of 2 or greater and organically bound isocyanate group concentrations of from about 1% by weight to about 60% by weight. The range of polyisocyanates that may be used include prepolymers, pseudoprepolymers, and other modified variants of monomeric polyisocyanates known in the art that contain free reactive organic isocyanate groups. In certain embodiments, the isocyanate compound is liquid at 25° C.; has a viscosity at 25° C. of less than 10,000 cps, such as 5000 cps; and has a concentration of free organically bound isocyanate groups ranging from 10% to 33.6% by weight. In certain embodiments, an MDI series of isocyanates that is essentially free of prepolymers can be used as component (i). In these embodiments, the isocyanates comprise less than 1% by weight (e.g., less than 0.1% by weight or, alternatively, 0% by weight) of prepolymerized species. Members of this MDI series comprise can have a concentration of free organically bound isocyanate groups ranging from 31% to 32% by weight, a number averaged isocyanate (NCO) group functionality ranging from 2.6 to 2.9, and a viscosity at 25° C. of less than 1000 cps.

In certain embodiments, the isocyanate compound can comprise ≥99 weight % of the binder composition based on the total weight of the composition. In these embodiments, components (ii) and (iii) of the composition (combined) would, therefore, comprise <1 weight % of the total weight of the composition.

The binder composition of the present invention also comprises a metallic catalyst as component (ii) in addition to the isocyanate compound described above. Suitable metallic catalysts that can used in the present invention as component (ii) include, without limitation, organometallic compounds, such as those that comprise at least one transition metal. The transition metal can be selected from Groups IVB, VB, VIIB, VIIB, and VIIIB of the Periodic Table of the Elements. In some embodiments, the metallic catalyst comprises an organometallic compound comprising one or more metals selected from the group consisting of the metals of Group VIIIB, such as iron, of the Periodic Table. In certain embodiments, the organometallic compound comprises one or more chelating ligands. Non limiting examples of such chelating ligands include, without limitation, acetylacetone, alkyl or aryl acetoacetate esters, gluconate, cyclopentadienyl, or combinations thereof. In some embodiments, the metallic catalyst that can be used as component (ii) can be any of those that are described in the following U.S. patents, which are fully incorporated herein by reference: U.S. Pat. Nos. 5,587,414, 6,288,200, 6,908,875, 6,750,310, 6,288,255, and 6,762,314.

Other suitable catalysts that can be used as component (ii) include, without limitation, organotin compounds, such as dialkyltindicarboxylates (e.g., dimethyltin dilaurate, bibutyltin dilaurate, dibutyltin di-2-ethyl hexoate, dibutyltin diacetate, dioctyltin dilaurate, dibutyltin maleate, dibutyltin diisoctylmaleate); stannous salts of carboxylic acids (e.g., stannous octoate, stannous diacetate, stannous dioleate); mono- and diorganotin mercaptides (e.g., dibutyltin dimercaptide, dioctyltin dimercaptide, dibutyltin diisooctylmercaptoacetate); diorganotin derivates of beta-diletones (e.g., dibutyltin bis-acetylacetonate); diorganotin oxides (e.g., dibutyltin oxide); and mono- or diorganotin halides (e.d., dimethyltin dichloride and dibutyltin dichloride). Other suitable catalysts that can be used as component (ii) also include, without limitation, organobismuth compounds, such as bismuth carboxylates (e.g., bismuth tris(2-ethlhexoate), bismuth neodecanoate, and bismuth naphtenate).

Accordingly, in certain embodiments, the metallic catalyst can include, without limitation, organometallilc compounds that are derived from iron (e.g., ferric acetylacetonate), cobalt acetylacetonate, nickel acetylacetonate, dibutyl tin dilaurate, dibutyltin mercaptide, bismuth tris(2-ethylhexoate) or combinations thereof. In certain embodiments, the metallic catalyst is an organometallic compound that is a derivative of iron. One skilled in the art would recognize that, in certain embodiments, ferric acetylacetonate, cobalt acetylacetonate, nickel acetylacetonate can be described as comprising a chelating ligand and a transition metal.

The metallic catalyst can be present in the binder composition at an amount ranging from 125 ppm to 1250 ppm based on the total weight of the binder composition. For example, in certain embodiments, the metallic catalyst is present in the binder composition at an amount ranging from 500 ppm to 1000 ppm based on the total weight of the binder composition.

In addition to the components (i) and (ii) described above, the binder composition of the present invention also comprises an acid or acidifying compound as component (iii). Suitable acid compounds that may be used as component (iii) include inorganic and organic acids. Suitable inorganic acids include, without limitation, anhydrous mineral acids (e.g., hydrogen chloride, hydrogen bromide, hydrogen fluoride, sulfuric acid, nitric acid, phosphoric acid); anhydrous Lewis acids (e.g., titanium tetrachloride, zirconium tetrachloride, aluminum trichloride, boron trifluoride); anhydrous chlorides (e.g., thionyl chloride). Suitable organic acids include, without limitation, aromatic carboxylic acid halides (e.g., benzoyl chloride, isophthaloyl dichloride, terephthaloyl dichloride, ortho-phthaloyldichloride, 4-nitrobenzoyl chloride); aliphatic or cycloaliphatic carboxylic acid halides (e.g., acetyl chloride, b-butyryl chloride, stearoyl chloride); sulfonic acids (e.g., p-tolune sulfonic acid, p-tolune sulphonyl chloride, tosyl chloride); aromatic, aliphatic or cycloaliphatic carbamyl chlorides (e.g., n-benzyl-n-phenylcarbamoyl chloride, n-methyl-n-phenylcarbamoyl chloride, butylcarbamyl chloride); aromatic chlorides (e.g., diphenylchloromethane); or combinations thereof. Other acid compounds that may be used as component (iii) include, without limitation, those that are readily soluble in polymeric MDI (PMDI) and which have low vapor pressure once in a binder. Examples of such acid compounds include, without limitation, gaseous hydrochloric acid, isophthaloyl dichloride, terephthaloyl dichloride, benzoyl chloride, thionyl chloride, or combinations thereof.

The aforementioned acid compound is present in the binder composition at an amount such that the acidity of the isocyanate compound ranges from 800 ppm to 10000 ppm, calculated as HCl based on ASTM D6099 or ISO 14898 Method A. For examples, in certain embodiments, the acid compound is present in the binder composition at an amount such that the acidity of the isocyanate compound ranges from 1000 ppm to 7000 ppm, such as from 1200 ppm to 6000 ppm and 1300 ppm to 4000 ppm, calculated as HCl. A detailed explanation outlining the actual amount of the acid compound that is added to the composition will not be provided since it would be well within the grasp of one having ordinary skill in the art to add the appropriate amount of acid compounds to yield the acidity ranges disclosed herein. By way of illustration, in one embodiment, adding between 3.6 grams to 11.1 grams of isophaloyl dichloride to 1000 grams of pMDI would yield an acidity range between 1300 to 4000 ppm, calculated as HCl.

In order to avoid undesirable self-reactions of the isocyanate binder prior to its use or during the lignocellulosic particles application process, in some embodiments the binder can be free or essentially free (i.e., free except for unavoidable impurities or trace amounts) of alkali metal or alkaline metal compounds. Alternatively, in other embodiments, the binder is free of alkali metal or alkaline metal compounds. By "self-reaction" it is meant reactions of the isocyanate groups with other isocyanate groups and/or other chemical groups present in the binder that are sufficient to interfere with the use of the binder or the storage thereof at ambient (e.g., room) temperature conditions under dry air or nitrogen for at least 1 week to 6 months. The free isocyanate content of the binder composition, expressed on a percent by weight basis, should not change by more than two percentage point during storage or prior to its application to the lignocellulosic particles.

In addition to components (i), (ii), and (iii), other optional compounds or materials may also be added to the binder composition. These additives can include, without limitation, fire retardants, such as tris-(chloropropyl)phosphate (TCPP), triethyl phosphate (TEP), triaryl phosphates such as triphenyl phosphate, melamine, melamine resins, and graphite; pigments; dyes; antioxidants such as triaryl phosphites (e.g., triphenyl phosphite), and hindered phenols (e.g., butylated hydroxyl tolune (BHT), octadecyl-3-(3,5-di-tert-butyl-4-hydroxylphenol)propionate); light stabilizers; expanding agents; inorganic fillers; organic fillers (distinct from the lignocellulosic material described herein); smoke suppressants; slack waxes (liquid or low melting hydrocarbon waxes); antistatic agents; internal mold release agents, such as soaps, dispersed solid waxes, silicones, and fatty acids; inert liquid diluents, especially non-volatile diluents such as triglyceride oils (e.g., soy oil, linseed oil, and the like); solvents, such as the relatively non volatile solvents such as propylene carbonate; biocides such as boric acid; or combinations of any of the forgoing. The methods for using these and other known optional additives and the specific instances and appropriate amounts will be well understood by those skilled in the art and a detailed discussion of such is not necessary.

The binder composition of the present invention is made using processes and equipment that are well known in the art. Accordingly, a detailed discussion of the process will not necessary. However, in general, the process involves mixing components (i), (ii), (iii), and, optionally, any additional compounds or materials, which are described above, together to form the binder composition.

Blended Mixture and Composite

As stated above, the present invention is also directed to a blended mixture or mass as well as a lignocellulosic composite. In certain embodiments, the blended mixture comprises the binder composition described above and a lignocellulosic material which is described in greater detail below. In certain embodiments, the lignocellulosic composite comprises the binder composition and a lignocellulosic material wherein both of these components have been combined and formed into the desired composite by using various methods known in the art.

The lignocellulosic materials that are used as component (b) of the blended mixture or the lignocellulosic composite can be selected from a wide variety of materials. For example, in some embodiments, the lignocellulosic material can be a mass of lignocellulosic particle materials. These particles can include, without limitation, wood chips or wood fibers or wood particles such as those used in the manufacture of orientated strand board (OSB), fiberboard, particleboard, carpet scrap, shredded non-metallic automotive wastes such as foam scrap and fabric scrap (sometimes referred to collectively as "light fluff"), particulate plastics wastes, inorganic or organic fibrous matter, agricultural by-products such as straw, baggasse, hemp, jute, waste paper products and paper pulp or combinations thereof.

As will be described in greater detail below, the lignocellulosic composite can be formed by applying the aforementioned binder composition onto at least one of a lignocellulosic material. These materials are thoroughly mixed to form a blended mixture prior to the mixture being subjected to heat, pressure, or a combination thereof thereby forming a lignocellulosic composite.

In certain embodiments, the aforementioned binder composition is applied onto the lignocellulosic materials, which is typically in the form of small chips, fibers, particles, or mixtures thereof, in a rotary blender or tumbler via one or more devices, such as spray nozzles or spinning disks, located in the blender. The lignocellulosic material is tumbled for an amount of time and sufficient to insure adequate distribution of the binder composition over the lignocellulosic materials thereby forming a blended mixture. Afterwards, the mixture is poured onto a screen or similar apparatus that approximates the shape of the final lignocellulosic composite. This stage of the process is called forming. During the forming stage the lignocellulosic materials are loosely packed and made ready for pressing. A constraining device, such as a forming box, is typically used in order to prevent the loose furnish for spilling out of the sides of the box. After the forming stage, the lignocellulosic materials are subjected to a pressing stage or pressing process where the lignocellulosic materials (including the binder composition) are subjected to elevated temperatures and pressure for a time period that is sufficient to cure the binder composition and form the desired lignocellulosic product. In certain embodiments, the pressing stage can be in the form of continuous or discontinuous presses. In some embodiments, the lignocellulosic materials are pressed at a temperature ranging from 148.0° C. to 232.2° C. for a pressing time cycle ranging from 1.5 minutes to 10 minutes. After the pressing stage, the lignocellulosic product that is typically formed can have a thickness ranging from 0.25 cm to 7.62 cm.

During the production of compression molded (pressed) boards, such as OSB, the forming operation typically takes place immediately after application of the binder composition to the lignocellulosic material. In some embodiments, the final hot pressing of the formed substrate takes place typically within an hour of the forming operation. In certain embodiments, the hot pressing stage takes place as soon as possible after the binder composition is applied to the lignocellulosic material, although delays typically occur during industrial practice. In some embodiments, the hot pressing stage take place within 2 hours, such as within 1 hour or within 30 minutes or within 20 minutes, of the binder composition being applied onto the lignocellulosic material.

In other embodiments, a lignocellulosic composite, such as oriented strand board, comprising separate surface and core layers may be formed using the binder composition and lignocellulosic materials described herein. OSB, for example, is typically constructed using two surface layers and one core layer wherein the orientation of the surface and core flake length is alternated by 90 degrees. This imparts certain mechanical properties and dimensional stability to the final lignocellulosic composite. One or more of the surface and core layers (hereinafter, "substrates") may be treated solely with the binder composition of the present invention or it can be treated with a combination of the binder composition and another adhesive that can be either an isocyanate-based adhesive (different from the binder composition of the present invention) or a PF (phenol formaldehyde resin) type adhesive.

Once the binder or adhesive is applied onto the substrates, the substrates are moved into a press and compression molded at a press temperature and for a period of time (press residence time) sufficient to cure the binder composition and, optional, adhesive. The amount of pressure applied in the press is sufficient to achieve the desired thickness and shape of the final composite. Pressing may optionally be conducted at a series of different pressures (stages). The maximum pressure is typically between 200 psi and 800 psi, but is more preferably from 300 psi and 700 psi. The total residence time in the press, for a typical OSB manufacturing process, is desirably between 6 seconds per millimeter panel thickness and 18 seconds per millimeter panel thickness, but more preferably between 8 seconds per millimeter panel thickness and 12 seconds per millimeter panel thickness. Pressing is typically accomplished with metal platens which apply pressure behind metal surface plates referred to as caul plates. The caul plates are the surfaces which come into direct contact with the adhesive treated furnish (board pre-forms) during pressing. The caul plates are typically carbon steel plates, but stainless steel plates are sometimes used. The metal surfaces of the caul plates which come into contact with the adhesive-treated lignocellulosic substrate are desirably coated with at least one external mold release agent in order to provide for recovery of the product without damage. External mold release treatments, suitable for press surfaces used in the production of compression molded lignocellulosic articles made from particulate substrates and isocyanate-based adhesives, are well known and their use will be appreciated by those skilled in the art. The use of external mold release is less important when the three layer approach (e.g., phenol formaldehyde resin used on the two outer layers with an isocyanate-based adhesive used in the core layer) is used, but is still desirable. Non-limiting examples of suitable external mold release agents include fatty acid salts such as potassium oletate soaps, or other low surface energy coatings, sprays, or layers.

After the pressing stage, the cured compression molded lignocellulosic composite is removed from the press and any remaining apparatus, such as forming screens and caul plates, is separated. Rough edges are typically trimmed from the lignocellulosic composite. The freshly pressed articles can then be subjected to conditioning for a specified time at a specified ambient temperature and relative humidity, in order to adjust the moisture content of the wood to a desired level. This conditioning step is optional however. While OSB is typically a flat board, the production of compression molded lignocellulosic articles with more complex three dimensional shapes is also possible.

Though specific embodiment of the invention has been described in detail for the OSB production, one skilled in the art could apply it to production of other types of compression molded lignocellulosic products such as fiberboard, medium density fiberboard (MDF), particle board, straw board, rice hull board, laminated veneer lumber (LVL) and the like.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof. Therefore, any of the features and/or elements which are listed above may be combined with one another in any combination and still be within the breadth of this disclosure.

EXAMPLES

Example 1

Two-ply Wood Veneer Lap Shear Composite Bonded with pMDI Binder (Control)

Lap Shear Sample Preparation and Testing Method

Binder cure speed and latency were determined by preparing laboratory lap shear joints. First, 60 mg of a pMDI binder (Rubinate 1840 from Huntsman) was applied with a small pant brush to one side of a wood veneer test piece tip. Next, two veneers (one coated, the other uncoated) were placed into an ABES testing device (from Automated Bondline Evaluation Systems, LLC) and pressed under controlled conditions. Immediately after each bond is partially or fully cured, the sample was tested to destruction in shear mode. Tensile load and pulling head movement (sample elongation) were monitored digitally during the pulling, and sheer strength was calculated. Table 1 describes the lap shear sample preparation conditions.

TABLE 1

| Lap Shear Preparation Conditions | |
|---|---|
| Species | yellow poplar (*Liriodendron tulipifera* L.) |
| Sample thickness | 0.6 mm |
| Sample size | 20 × 115 mm |
| Sample overlap | 5 × 20 mm (area = 100 mm$^2$) |
| Binder application | 50-80 mg |
| Wood Moisture %: | 10% |
| Pressing Temp ° C.: | 95° C. |
| Pressing Pressure: | 8 bar |
| Pressing Time (sec): | 40 and 180 sec |

Samples were tested at two pressing cycles to determine "under-cure" strength (40 seconds), and "full-cure" strength (180 seconds). Bond strength at the under-cure cycle describes cure speed. Additionally, a "Life on Chip" (LOC) test was performed to evaluate a binders latency following a heated aging cycle prior to pressing. This test simulates the dwell time (after blending and before pressing) in an industrial wood composite plant. In this LOC test, the test binder was applied to the wood sample and was followed by a conditioning period of 30 minutes in a 65° C. oven. Percent LOC was calculated by dividing the conditioned bonded strength by the unconditioned bond strength at 180 seconds. Ten samples were measured for each condition and the mean testing results are listed in Table 2 below.

Example 2

Two-ply Wood Veneer Lap Shear Composite Bonded with Dibutyltin Dilaurate (DBTDL) Catalyzed pMDI Binder A Dibutlytin Dilaurate catalyst (Reaxis C218, Reaxis Inc.) was added to a pMDI binder (Rubinate 1840, Huntsman Corp.) To 250 grams of pMDI, 0.1250 gram of DBTDL was added to a 300 ml glass jar. A nitrogen airspace was added to the jar, the jar was capped, and the mixture was shake mixed for approximately 1 minute.

Lap shear samples were constructed (using the catalyzed binder) according to the "Lap Shear Sample Preparation and Testing Method" described in Example 1. Ten samples were measured for each condition and the mean testing results are listed in Table 2 below.

Example 3

Two-ply Wood Veneer Lap Shear Composite Bonded with an Acidified (Thionyl Chloride) pMDI Binder Thionyl chloride (from Aldrich) was added to a pMDI binder (Rubinate 1840, Huntsman Corp.) To 500 grams of pMDI, 2.35 gram of thionyl chloride and was added to the pMDI in a 500 ml glass jar. A nitrogen airspace was added to the jar, the jar was capped, and the combination was shake mixed for approximately 1 minute. The acidity of the resulting isocyanate was measured as 3456 ppm, calculated as HCl following ASTM D6099.

Lap shear samples were constructed (using the acidified binder) according to the "Lap Shear Sample Preparation and Testing Method" described in Example 1. Ten samples were measured for each condition and the mean testing results are listed in Table 2 below.

Example 4

Two-ply Wood Veneer Lap Shear Composite Bonded with an Acidified (Thionyl Chloride), and Catalyzed (DBTDL) pMDI Binder A Dibutlytin Dilaurate catalyst (Reaxis C218) was added to an acidified pMDI binder described in Example 3. To 250 grams of thionyl chloride acidified pMDI 0.1250 gram of DBTDL was added to a 300 ml glass jar. A nitrogen airspace was added to the jar, and the mixture was shake mixed for approximately 1 minute.

Lap shear samples were constructed (using the acidified/catalyzed binder) according to the "Lap Shear Sample Preparation and Testing Method" described in Example 1. Ten samples were measured for each condition and the mean testing results are listed in Table 2 below.

TABLE 2

| Example Number | Metallic Catalyst* | Acid Type** | Strength 40 sec. (N) | Percent LOC (%) | Characteristics*** |
|---|---|---|---|---|---|
| 1 | None | None | 42 | 76 | Control |
| 2 | 500 ppm of DBTDL | None | 183 | 25 | Fast |
| 3 | None | 3456 ppm of TC | 52 | 100 | Latent |
| 4 | 500 ppm of DBTDL | TC | 75 | 97 | Fast and Latent |

*Catalyst Notes DBTDL = Dibutyltin dilaurate
**Acid Notes TC = Thionyl chloride
***Characteristics Notes (F) = Fast (L) = Latent Example 5

Two-ply Wood Veneer Lap Shear Composite Bonded with Zirconium Acetyl Acetonate Catalyzed pMDI Binder A Zirconium acetyl acetonate (ZrAcAc) catalyst (from Aldrich) was added to a pMDI binder (Rubinate 1840, Huntsman Corp.) To 250 grams of pMDI, 0.1203 gram of ZrAcAc was added to a 300 ml glass jar. A nitrogen airspace was added to the jar, the jar was capped, and the mixture was shake mixed for approximately 1 minute.

Lap shear samples were constructed (using the catalyzed binder) according to the "Lap Shear Sample Preparation and Testing Method" described in Example 1. Ten samples were measured for each condition and the mean testing results are listed in Table 3 below.

Example 6

Two-ply Wood Veneer Lap Shear Composite Bonded with Benzoyl Chloride (BC) Acidified pMDI Binder Benzoyl chloride (from Aldrich) was added to a pMDI binder (Rubinate 1840, Huntsman Corp.) To 500 grams of pMDI, 5.2 gram of benzoyl chloride, melted at 40° C., and was added to the pMDI in a 500 ml glass jar. A nitrogen airspace was added to the jar, the jar was capped, and the combination was shake mixed for approximately 1 minute. The mixture was then heated in an oven for 2 hours at 40° C. and then cooled to room temperature. The acidity of the resulting isocyanate was measured as 2795 ppm, calculated as HCl following ASTM D6099.

Lap shear samples were constructed (using the acidified binder) according to the "Lap Shear Sample Preparation and Testing Method" described in Example 1. Ten samples were measured for each condition and the mean testing results are listed in Table 3 below.

Example 7

Two-ply Wood Veneer Lap Shear Composite Bonded with an Acidified (Benzoyl Chloride), and Catalyzed (ZrAcAC) pMDI Binder A Zirconium acetyl acetonate (ZrAcAc) catalyst (from Aldrich) was added to an acidified pMDI binder described in Example 6. To 250 grams of BC acidified pMDI, 0.1203 gram of ZrAcAc was added to a 300 ml glass jar. A nitrogen airspace was added to the jar, and the mixture was shake mixed for approximately 1 minute.

Lap shear samples were constructed (using the acidified/catalyzed binder) according to the "Lap Shear Sample Preparation and Testing Method" described in Example 1. Ten samples were measured for each condition and the mean testing results are listed in Table 3 below.

TABLE 3

| Example Number | Catalyst Type* | Acid Type** | Strength 40 sec. (N) | Percent LOC (%) | Characteristics*** |
|---|---|---|---|---|---|
| 1 | None | None | 42 | 76 | Control |
| 5 | 500 ppm of ZrAcAc | None | 92 | 67 | Fast |
| 6 | None | IPDC | 79 | 90 | |
| 7 | 500 ppm | 2800 ppm | 69 | 98 | Fast and Latent |

TABLE 3-continued

| Example Number | Catalyst Type* | Acid Type** | Strength 40 sec. (N) | Percent LOC (%) | Characteristics*** |
|---|---|---|---|---|---|
| | of ZrAcAC | of BC | | | |

*Catalyst Notes DBTDL = Dibutyltin dilaurate
**Acid Notes BC = Benzoyl chloride
***Characteristics Notes (F) = Fast (L) = Latent As can be observed from the results in Tables 2 and 3, binder cure speed can be enhanced with the addition of a catalyst. Similarly, latency can be improved with the addition of an acid. However, the combinations of improved cure speed and latency are observed in Example 4 and 7.

What is claimed is:

1. A blended material comprising (i) a binder composition comprising an isocyanate compound, a metallic catalyst, and an acid compound wherein the acid compound is present in the binder composition at an amount such that the acidity of the isocyanate compound ranges from 800 ppm to 10000 ppm, calculated as HCl; and (ii) a lignocellulosic material.

2. The blended material according to claim 1, wherein the metallic catalyst is present in the composition at an amount ranging from 125 ppm to 1250 ppm based on the total weight of the binder composition.

3. The blended material according to claim 1, wherein the metallic catalyst comprises an organometallic compound that comprises a transition metal, an organotin compound, an organobismuth compound, or combinations thereof.

4. The blended material according to claim 3, wherein the transition metal comprises a Group VIIIB metal.

5. The blended material according to claim 1, wherein the metallic catalyst comprises ferric acetylacetonate, cobalt acetylacetonate, nickel acetylacetonate, dibutyl tin dilaurate, dibutyltin mercaptide, bismuth tris(2-ethylhexoate) or combinations thereof.

6. The blended material according to claim 1, wherein the acid compound comprises gaseous hydrochloric acid, isophthaloyl dichloride, terephthaloyl dichloride, benzoyl chloride, thionyl chloride, or combinations thereof.

7. The blended material according to claim 1, wherein the acid compound is present in the binder composition at an amount such that the acidity of the isocyanate compound ranges from 1200 ppm to 6000 ppm, calculated as HCl.

8. The blended material according to claim 7, wherein the lignocellulosic material comprises cellulosic chips, cellulosic flakes, cellulosic strands, or combinations thereof.

9. A lignocellulosic composite comprising: (a) a binder composition comprising an isocyanate compound, a metallic catalyst, and an acid compound wherein the acid compound is present in the binder composition at an amount such that the acidity of the isocyanate compound ranges from 800 ppm to 10000 ppm, calculated as HCl; and (b) a lignocellulosic material.

10. The lignocellulosic composite according to claim 9, wherein the acid compound is present in the binder composition at an amount such that the acidity of the isocyanate compound ranges from 1200 ppm to 6000 ppm, calculated as HCl.

11. The lignocellulosic composite according to claim 9, wherein the metallic catalyst comprises an organometallic compound that comprises a transition metal, an organotin compound, an organobismuth compound, or combinations thereof.

12. The lignocellulosic composite according to claim 9, wherein the metallic catalyst comprises ferric acetylacetonate, cobalt acetylacetonate, nickel acetylacetonate, dibutyl tin dilaurate, dibutyltin mercaptide, bismuth tris(2-ethylhexoate) or combinations thereof.

13. The lignocellulosic composite according to claim 9, wherein the acid compound comprises gaseous hydrochloric acid, isophthaloyl dichloride, terephthaloyl dichloride, benzoyl chloride, thionyl chloride, or combinations thereof.

14. The lignocellulosic composite according to claim 9, wherein the lignocellulosic material comprise particle board, cellulosic chips, cellulosic flakes, cellulosic strands, or combinations thereof.

15. A method for producing a lignocellulosic composite comprising forming a blended mixture by applying to at least one of a plurality of lignocellulosic materials a binder composition comprising an isocyanate compound, a metallic catalyst, and an acid compound wherein the acid compound is present in the composition at an amount such that the acidity of the isocyanate compound ranges from 800 ppm to 10000 ppm, calculated as HCl; and subjecting the blended mixture to heat and pressure sufficient to form the lignocellulosic composite.

16. The method according to claim 15, wherein the acid compound is present in the binder composition at an amount such that the acidity of the isocyanate compound ranges from 1200 ppm to 6000 ppm, calculated as HCl.

17. The method according to claim 15, wherein the metallic catalyst comprises an organometallic compound that comprises a transition metal, an organotin compound, an organobismuth compound, or combinations thereof.

18. The method according to claim 17, wherein the metallic catalyst comprises ferric acetylacetonate, cobalt acetylacetonate, nickel acetylacetonate, dibutyl tin dilaurate, dibutyltin mercaptide, bismuth tris(2-ethylhexoate) or combinations thereof.

19. The method according to claim 18, wherein the organometallic compound comprises ferric acetylacetonate.

20. The method according to claim 15, wherein the acid compound comprises gaseous hydrochloric acid, isophthaloyl dichloride, terephthaloyl dichloride, benzoyl chloride, thionyl chloride, or combinations thereof.

* * * * *